(12) United States Patent
Wang et al.

(10) Patent No.: US 8,989,824 B2
(45) Date of Patent: Mar. 24, 2015

(54) ELECTRONIC DEVICES WITH IMPROVED SWITCH ASSEMBLY CONSTRUCTIONS

(75) Inventors: Erik L. Wang, Redwood City, CA (US); Tang Yew Tan, Redwood, CA (US); Adam Duckworth Mittleman, San Francisco, CA (US); Richard Hung Minh Dinh, San Jose, CA (US); Philip Michael Hobson, Menlo Park, CA (US); Andrew Lewis Johnston, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1457 days.

(21) Appl. No.: 11/824,208

(22) Filed: Jun. 28, 2007

(65) Prior Publication Data
US 2008/0167091 A1    Jul. 10, 2008

Related U.S. Application Data

(60) Provisional application No. 60/878,909, filed on Jan. 5, 2007.

(51) Int. Cl.
*H04M 1/00* (2006.01)
*G06F 3/0362* (2013.01)
*G06F 1/16* (2006.01)

(52) U.S. Cl.
CPC ............ *G06F 3/0362* (2013.01); *G06F 1/1626* (2013.01); *G06F 1/1656* (2013.01); *G06F 1/1671* (2013.01); *G06F 2200/1633* (2013.01)
USPC ................ 455/575.1; 455/575.4; 379/433.11; 379/433.12; 379/433.13; 200/336; 200/410; 200/428; 200/564

(58) Field of Classification Search
USPC ............ 455/550.1, 556.1, 557, 575.1, 575.4, 455/575.6, 575.8; 375/357.03, 433.07, 375/433.11, 433.12, 433.13; 200/339, 336, 200/43.08, 51.17, 61.39, 410, 578, 564; 337/57; 192/219.5
See application file for complete search history.

(56) References Cited

U.S. PATENT DOCUMENTS

| | | | | |
|---|---|---|---|---|
| 3,943,477 | A * | 3/1976 | Kidd et al. | 337/57 |
| 4,089,394 | A * | 5/1978 | Haupt et al. | 192/219.5 |
| 5,377,263 | A * | 12/1994 | Bazemore et al. | 379/357.03 |
| 6,292,562 | B1 * | 9/2001 | Badarneh | 379/433.07 |
| 7,496,194 | B2 * | 2/2009 | Jeun | 379/433.11 |
| 7,548,769 | B2 * | 6/2009 | Lee et al. | 455/575.1 |
| 2005/0003870 | A1 * | 1/2005 | Nakano et al. | 455/575.1 |
| 2005/0051413 | A1 * | 3/2005 | Altmann | 200/339 |
| 2007/0026297 | A1 * | 2/2007 | Qin et al. | 429/97 |
| 2008/0119248 | A1 * | 5/2008 | Nissen et al. | 455/575.4 |

FOREIGN PATENT DOCUMENTS

JP            08074997 A  *  3/1996  ............. F16H 63/02

* cited by examiner

*Primary Examiner* — Junpeng Chen
(74) *Attorney, Agent, or Firm* — Brownstein Hyatt Farber Schreck, LLP

(57) ABSTRACT

Electronic devices are provided with housings that can have smoother profiles and with switch assembly input components with knobs that can move along tracks in directions at least partially offset from the directions of anticipated resistive forces. The housings can include switch assembly input components with knobs that may move along linear tracks and switch assembly input components with knobs that may move along curved tracks.

20 Claims, 22 Drawing Sheets

US 8,989,824 B2

ELECTRONIC DEVICES WITH IMPROVED SWITCH ASSEMBLY CONSTRUCTIONS

CROSS-REFERENCE TO RELATED APPLICATIONS

This claims the benefit of U.S. Provisional Application No. 60/878,909, filed Jan. 5, 2007, which is hereby incorporated by reference herein in its entirety.

BACKGROUND OF THE DISCLOSURE

The present invention can relate to apparatus and methods for improving the construction of switch assemblies of electronic devices.

The proliferation of electronic devices (e.g., portable MP3 players) and the various ways in which such devices are being transported (e.g., in carrying cases attached to exercising users) have created a need for improved construction of switch assemblies for such devices.

Some known personal electronic devices include at least one user input component that allows a user to manipulate the function of the device, at least one device output component that provides the user with valuable device generated information, and a protective housing that at least partially encloses the input and output components. FIGS. 1-4 show a prior art electronic device 100 including a user input component 110, a device output component 120, and a protective housing 130. As shown, input component 110 is a switch assembly that includes a linear track 112 within which a switch 114 can slide between a first position (shown as solid-lined position 114A) at a first point along the length of track 112 and at least a second position (shown as broken-lined position 114B) at a second point along the length of track 112. A user of device 100 can slide switch 114 along track 112, either in the linear direction of arrow 116B from position 114A to position 114B or in the linear direction of arrow 116A from position 114B to position 114A, to change a functional state of device 100 (e.g., whether the device should power up or turn itself off).

A disadvantage of conventional electronic devices, such as device 100 shown in FIGS. 1-4, is that the surfaces of the housing are generally flat and form sharp edges and corners at their intersects, thereby creating abrupt portions susceptible to snagging as the device is inserted into a carrying case (e.g., a user's pocket). With further reference to FIGS. 1-4, prior art electronic device 100 may be inserted by a user into a hollow 141 of a carrying case 140 in the direction of arrow 150, for example. As shown in FIGS. 1 and 2, as device 100 is inserted into hollow 141 of case 140 in the direction of arrow 150, the sharp edge 132 formed by the intersect of flat bottom wall 131 and flat left side wall 133 of housing 130, for example, may inadvertently catch on a portion of case 140 (e.g., lip portion 142 at the top of side wall 143). This catching causes side wall 143 of case 140 to exert a resistive force on edge 132 of housing 130 in the direction of arrow 160, generally opposite to that of arrow 150, thereby hindering the efforts of inserting device 100 into hollow 141 of case 140.

Another disadvantage of conventional electronic devices, such as device 100 shown in FIGS. 1-4, is that the switch of the conventional switch assembly input component tends to inadvertently slide along its linear track as the device is inserted into a carrying case, such as case 140. As shown in FIGS. 3 and 4, as device 100 is inserted further into hollow 141 of case 140 in the direction of arrow 150, switch 114 may inadvertently catch on a portion of case 140 (e.g., lip portion 142). This catching causes case 140 to exert a resistive force on switch 114 of input component 110 in the direction of arrow 160, generally opposite to that of arrow 150, thereby inadvertently sliding switch 114 in the direction of arrow 160 (and of arrow 116B) from position 114A to position 114B.

SUMMARY OF THE DISCLOSURE

Personal electronic devices with housings having smoother profiles and with switch assembly input components having switches that move along tracks in directions at least partially offset from the directions of anticipated resistive forces are provided.

According to a particular embodiment of the present invention, there is provided an electronic device that can include a housing having a first surface, and a switch assembly user input component having a user track in the first surface and a user knob capable of sliding along the user track in at least a first user direction, wherein the first user direction can be offset from a direction of a resistive force applied to the user knob. In an alternative embodiment of the present invention, there is provided a user input component for an electronic device. The input component can include a user track, a knob capable of rotational movement along the user track, a switch track, a switch capable of linear movement along the switch track for changing an operational state of the media device, and an adaptor coupled to the knob and the switch, wherein the adaptor can be capable of translating the knob movement along the user track to the switch movement along the switch track.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
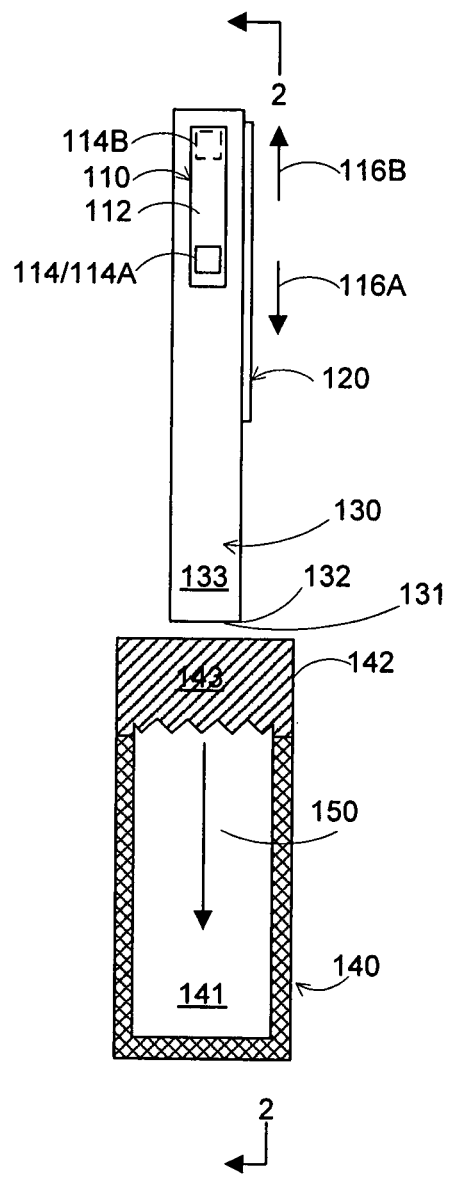
FIG. 1 is a side elevational view of a prior art electronic device in a first stage of insertion into a carrying case, but with most of a side wall of the carrying case omitted.
Figure 2:
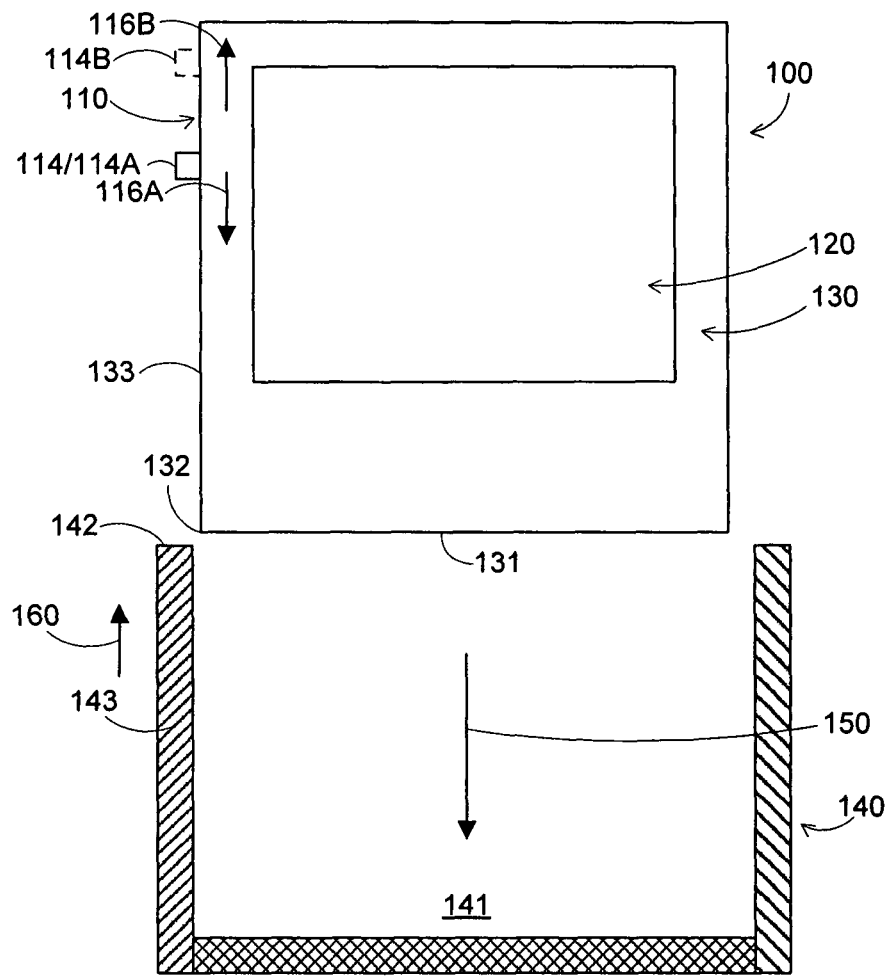
FIG. 2 is a front elevational view of the prior art electronic device and carrying case of FIG. 1, taken from line 2-2 of FIG. 1.
Figure 3:
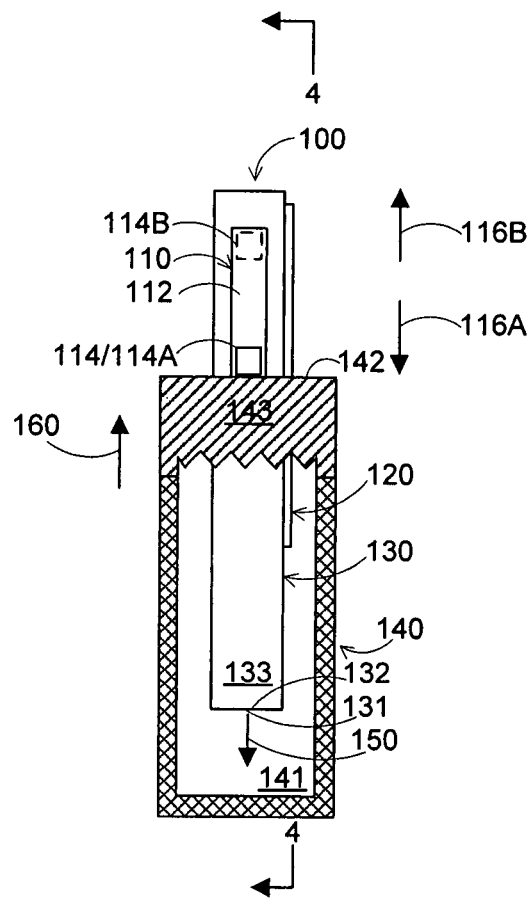
FIG. 3 is a side elevational view of the prior art electronic device and carrying case of FIGS. 1 and 2, similar to FIG. 1, but with the electronic device in a second stage of insertion into the carrying case.
Figure 4:
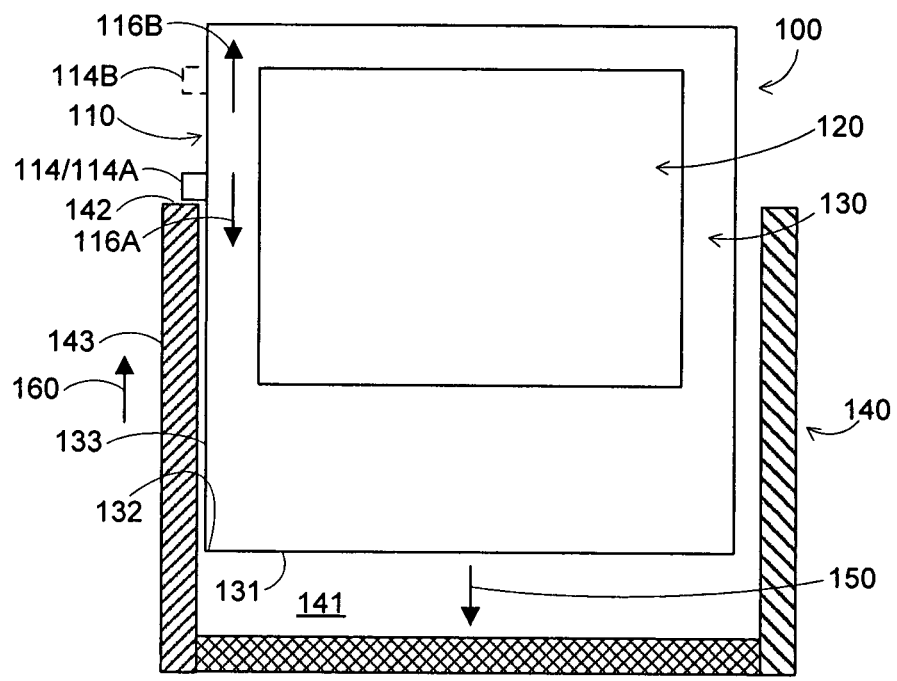
FIG. 4 is a front elevational view of the prior art electronic device and carrying case of FIGS. 1-3, taken from line 4-4 of FIG. 3.
Figure 5:
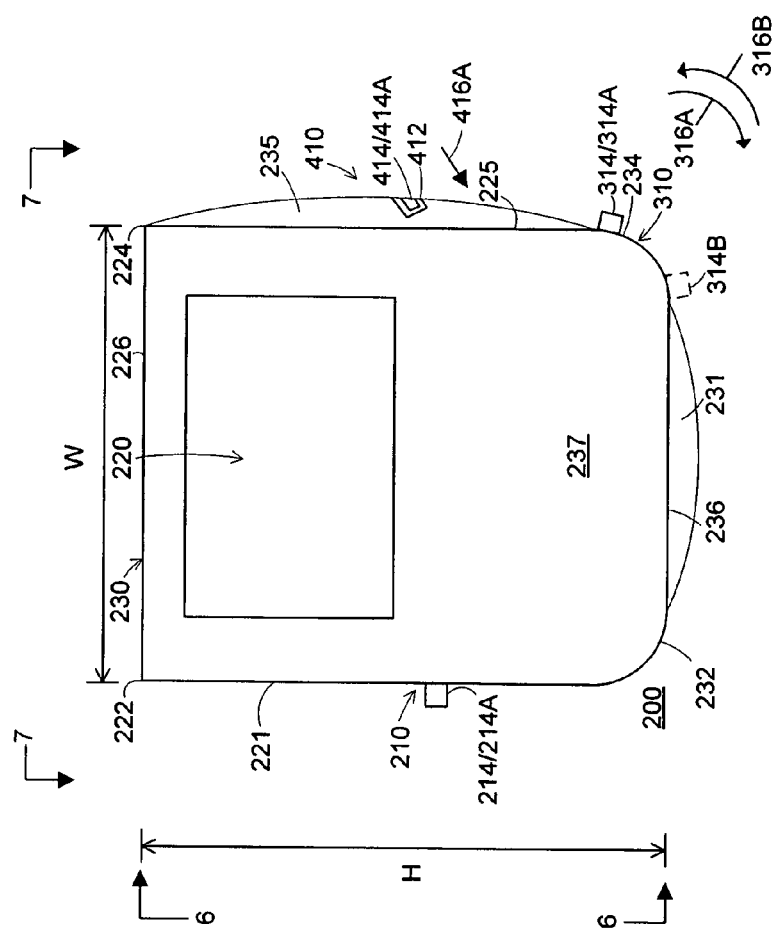
FIG. 5 is a front elevational view of an electronic device in accordance with the principles of the present invention.
Figure 6:
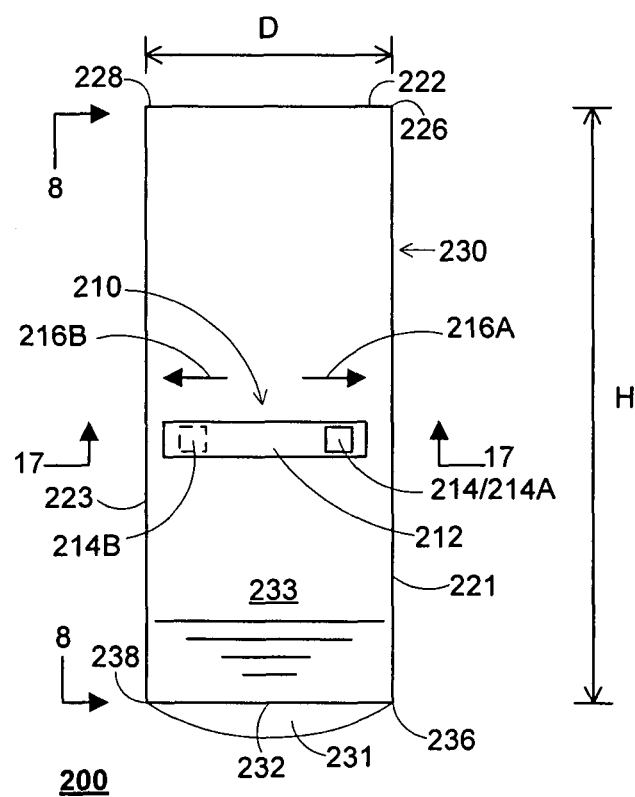
FIG. 6 is a side elevational view of the electronic device of FIG. 5, taken from line 6-6 of FIG. 5.

Apparatus and methods are provided for improving the construction of switch assemblies of electronic devices, and are described below with reference to FIGS. 5-22.

FIGS. 5-10 show an embodiment of personal electronic device 200 including at least one user input component. The term "personal electronic device" can include, but is not limited to, music players, video players, still image players, game players, other media players, music recorders, video recorders, cameras, other media recorders, radios, medical equipment, calculators, cellular telephones, other wireless communication devices, personal digital assistants, programmable remote controls, pagers, laptop computers, printers, or combinations thereof. In some cases, the electronic devices may perform a single function (e.g., a device dedicated to playing music) and, in other cases, the electronic devices may perform multiple functions (e.g., a device that plays music, displays video, stores pictures, and receives and transmits telephone calls).

In any case, these electronic devices are generally any portable, mobile, hand-held, or miniature electronic device having a user input component constructed in accordance with the principles of the present invention so as to allow a user to listen to music, play games, record videos, take pictures, and/or conduct telephone calls wherever the user travels. Miniature personal electronic devices may have a form factor that is smaller than that of hand-held personal media devices, such as an iPod™ available by Apple Inc. of Cupertino, Calif. Illustrative miniature personal electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof. Alternatively, electronic devices that incorporate a user input component may not be portable at all.

Personal electronic device 200 can include at least one user input component (see, e.g., input component 210) that allows a user to manipulate a function of the device, at least one device output component (see, e.g., output component 220) that provides the user with valuable device generated information, and a protective housing (see, e.g., housing 230) that at least partially encloses the one or more input and output components of the device.

As shown in FIGS. 5-10, for example, housing 230 of device 200 can be hexahedral and may include top wall 229, bottom wall 231, left side wall 233, right side wall 235, front wall 237, and back wall 239. While each of the walls of housing 230 may be substantially flat (see, e.g., top wall 229), the contour of one or more of the walls of housing 230 can be at least partially curved (see, e.g., bottom wall 231 and right side wall 235), or jagged, or any other suitable shape or combination thereof, in order to contour at least a portion of the surface of the device to the hand of a user, for example.

Generally, housing 230 may be said to have a depth D defined not only by the lengths of edges 222 and 232 formed by the intersects of left side wall 233 with top wall 229 and bottom wall 231, respectively, but also by the lengths of edges 224 and 234 formed by the intersects of right side wall 235 with top wall 229 and bottom wall 231, respectively. Similarly, housing 230 may be said to have a width W defined not only by the lengths of edges 226 and 236 formed by the intersects of front wall 237 with top wall 229 and bottom wall 231, respectively, but also by the lengths of edges 228 and 238 formed by the intersects of back wall 239 with top wall 229 and bottom wall 231, respectively. Finally, housing 230 may be said to have a height H defined not only by the lengths of edges 221 and 223 formed by the intersects of left side wall 233 with front wall 237 and back wall 239, respectively, but also by the lengths of edges 225 and 227 formed by the intersects of right side wall 235 with front wall 237 and back wall 239, respectively. It should be noted that housing 230 of device 200 described above is only exemplary and need not be substantially hexahedral, and that, in certain embodiments, the intersects of certain walls may be beveled, and housing 230 itself could generally be formed in any other suitable shape, including, but not limited to, substantially spherical, ellipsoidal, conoidal, octahedral, or a combination thereof, for example.

Figure 11:
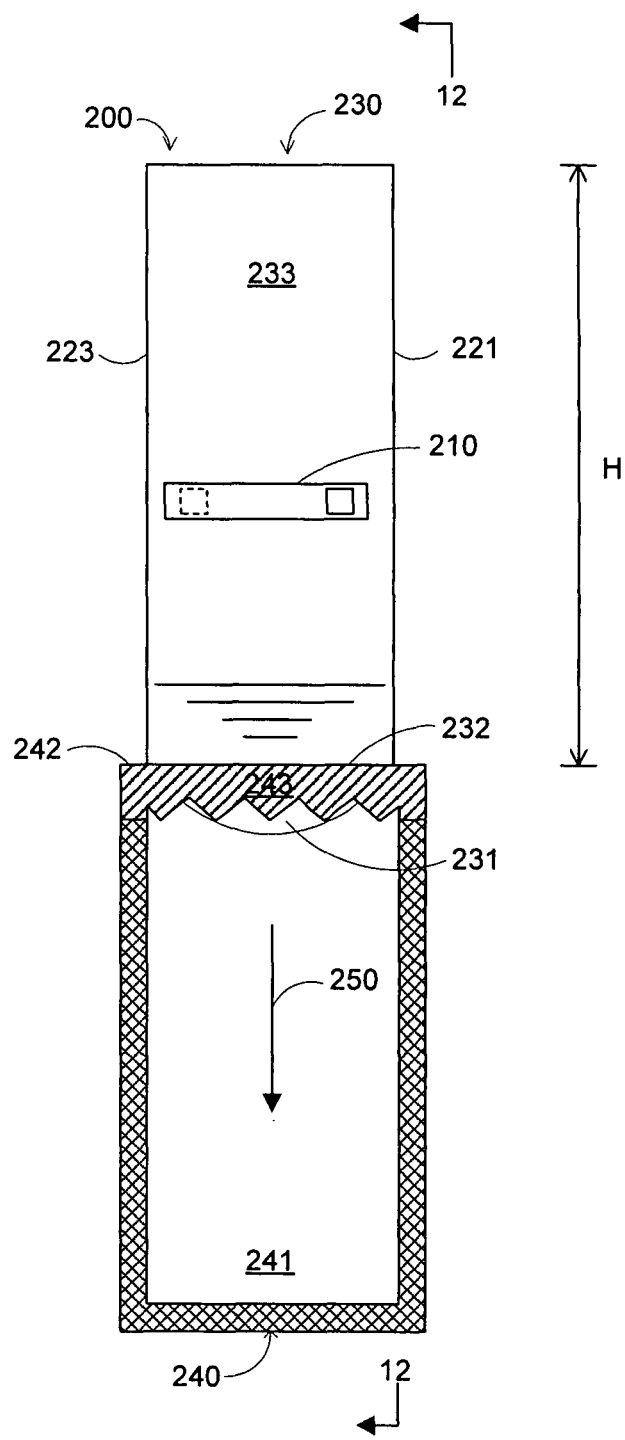
FIG. 11 is a side elevational view of the electronic device of FIGS. 5-10, similar to FIG. 6, in a first stage of insertion into a carrying case, but with most of a side wall of the carrying case omitted.
Figure 12:
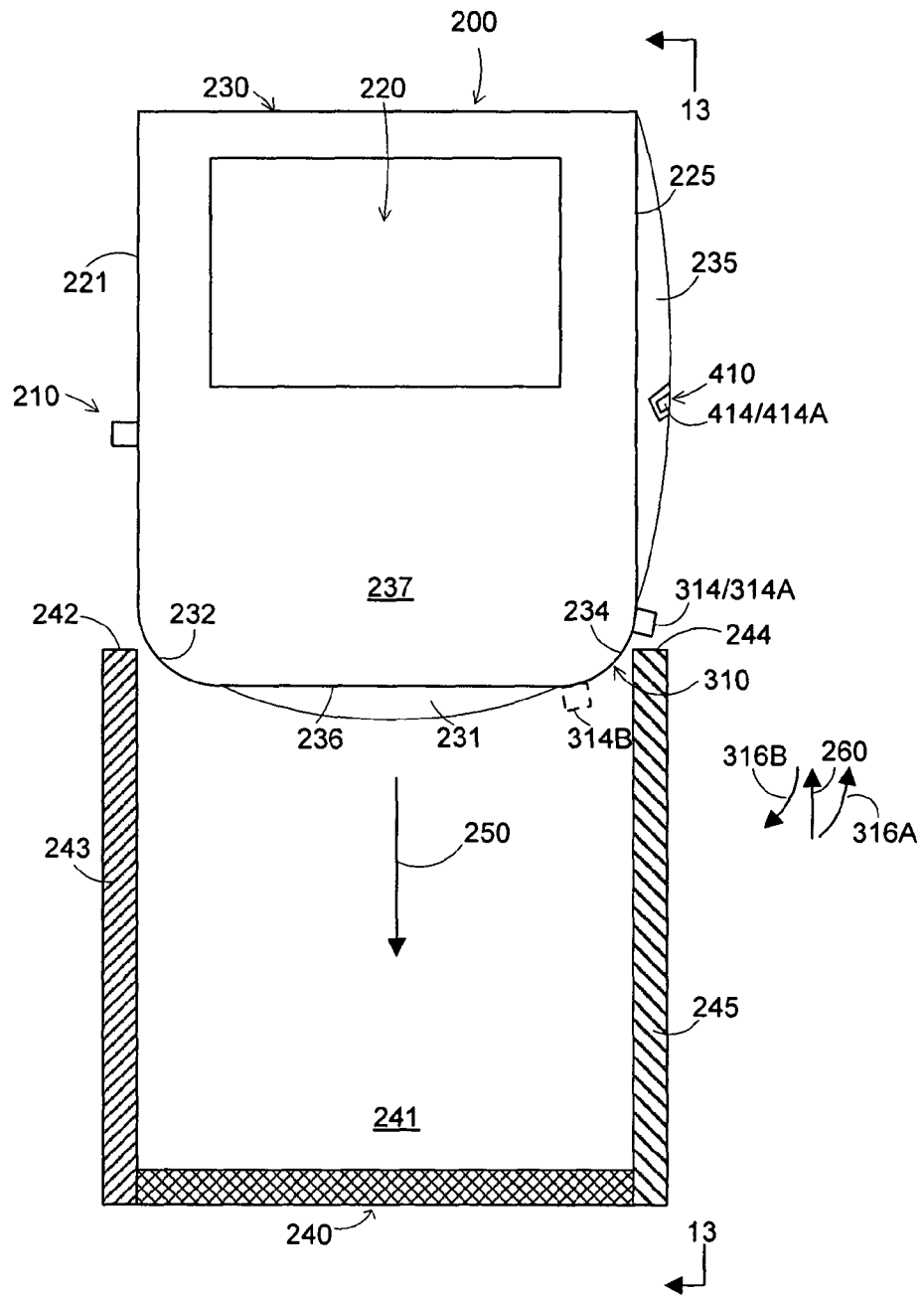
FIG. 12 is a front elevational view of the electronic device of FIGS. 5-11 and the carrying case of FIG. 11, taken from line 12-12 of FIG. 11.

As described above with respect to prior art media device 100 of FIGS. 1-4, a disadvantage of conventional electronic devices is that the surfaces of the housing are generally flat and form sharp edges and corners at their intersects, thereby creating abrupt portions susceptible to snagging as the device is inserted into a carrying case (e.g., a user's pocket). Therefore, one or more surfaces or intersects (i.e., "edges" if the intersects are of two walls, and "corners" if the intersects are of three walls (or three edges)) of the housing of device 200 can be curved or rounded such that the electronic device may be smoothly inserted by a user into a hollow of a carrying case without snagging on those one or more intersects. For example, as shown in FIGS. 11 and 12, edge 232 formed by the intersect of curved bottom wall 231 and substantially flat left side wall 233 of housing 230 can be curved such that edge 232 does not catch a portion of a case 240 (e.g., a lip portion 242 at the top of a side wall 243 of case 240) as device 200 is inserted into a hollow 241 of case 240 in the direction of arrow 250. Instead, curved edge 232 can smoothly slide past lip portion 242 and into hollow 241 of case 240 substantially in the direction of arrow 250.

According to certain embodiments of the present invention, electronic device 200 can include at least one user input component that is a linear sliding switch assembly. As shown in FIGS. 5-10 and 17-19, for example, input component 210 can be a linear sliding switch assembly that includes a linear or straight and flat path or track 212 running along and through a portion of flat left side wall 233 of housing 230. A switch 214 can slide within track 212 between a first position (shown as solid-lined position 214A) at a first point along the length of track 212 and at least a second position (shown as broken-lined position 214B) at a second point along the length of track 212. A user of device 200 can slide switch 214 along track 212, either in the linear direction of arrow 216B from position 214A to position 214B or in the linear direction of arrow 216A from position 214B to position 214A, to change a functional state of device 200 (e.g., whether the device should power up or turn itself off).

Figure 17:
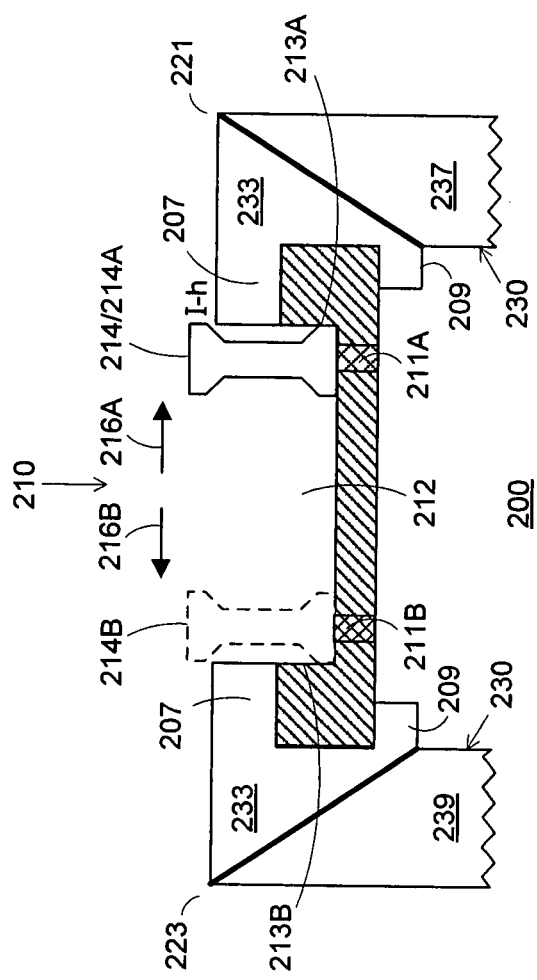
FIG. 17 is a partial horizontal cross-sectional view of the electronic device of FIGS. 5-16, taken from line 17-17 of FIG. 6.
Figure 18:
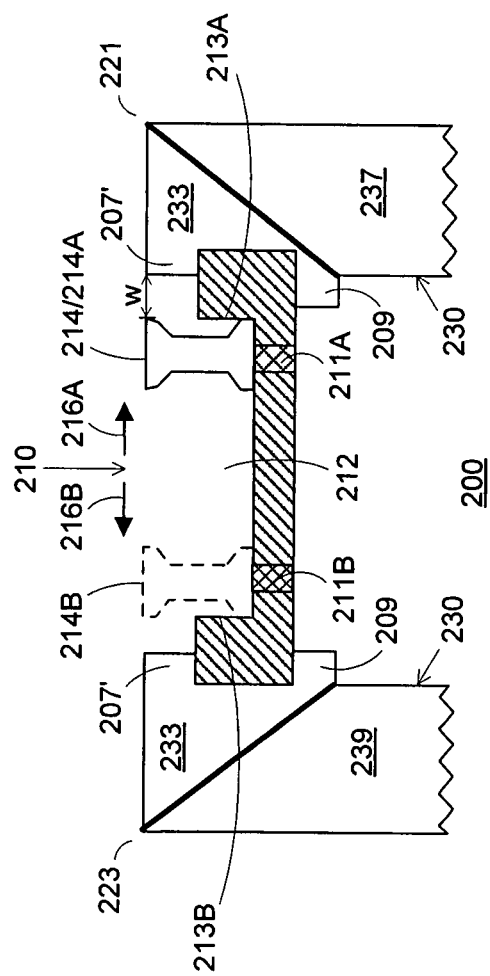
FIG. 18 is a partial horizontal cross-sectional view of the electronic device of FIGS. 5-16, similar to FIG. 17, but with another embodiment of a linear sliding switch assembly input component in accordance with the principles of the present invention.
Figure 19:
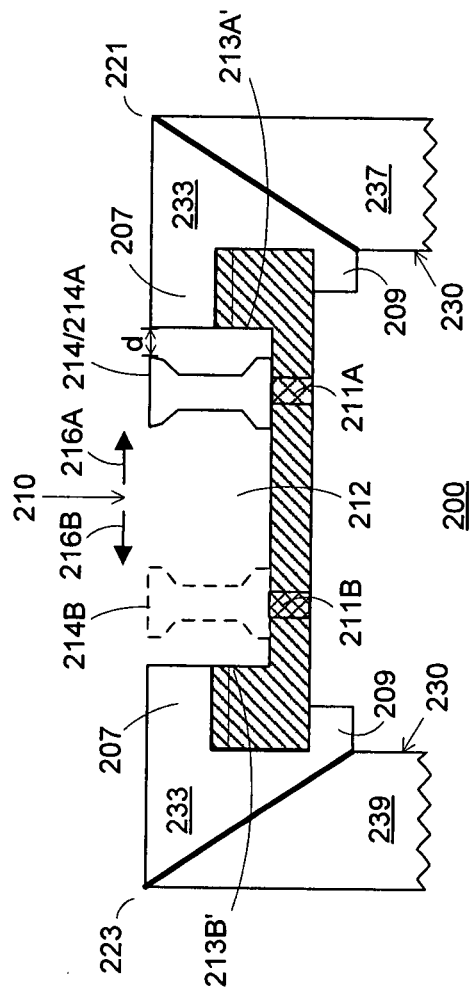
FIG. 19 is a partial horizontal cross-sectional view of the electronic device of FIGS. 5-16, similar to FIGS. 17 and 18, but with yet another embodiment of a linear sliding switch assembly input component in accordance with the principles of the present invention.

As shown in FIGS. 17-19, for example, switch assembly input component 210 can also include one or more contact points (e.g., contact points 211A and 211B) running through track 212 under at least one of the functional positions of switch 214 (e.g., positions 214A and 214B). Each of the one or more contact points 211 of input component 210 can be coupled to a processor (not shown, but described in greater detail hereinbelow) of device 200 contained within housing 230. When switch 214 is at a functional position along track 212, the switch thereby touches a contact point and the function or logic of the processor of device 200 may be changed.

Track 212 of switch assembly input component 210 can be held in place within housing 230 in various ways such that switch 214 is accessible to a user external to housing 230. For example, as shown in FIGS. 17-19, track 212 can be held in place about its top and bottom by external bracket portions 207 and internal bracket portions 209 of housing 230, respectively.

As shown in FIG. 17, for example, one or more of the functional positions (e.g., positions 214A and 214B) of switch 214 along track 212 may be substantially at the ends 213A and 213B of track 212. Therefore, in order for a user to be able to slide the switch along the track, switch 214 can extend away from track 212 above the external portions 207 of housing 230 to a height h, such that a user (e.g., with its finger) may be able to exert a force on the side of switch 214 above external portion 207 of housing 230 to slide switch 214 along track 212 from position 214A to position 214B in the direction of arrow 216B, for example. In this embodiment of input component 210 shown in FIG. 17, for example, a portion of switch 214 can extend from track 212 to a height h above the external portion 207 of housing 230, thereby causing the profile of housing 230 of device 200 to not be smooth at the area where input component 210 resides.

As described above with respect to prior art media device 100 of FIGS. 1-4, another disadvantage of conventional electronic devices is that the switch of the conventional switch assembly input component tends to inadvertently slide along its linear track as the device is inserted into a carrying case. Therefore, a switch assembly input component of device 200, such as input component 210 of FIG. 17, for example, can be oriented with respect to the geometry of the housing such that the media device may be inserted by a user into a hollow of a carrying case without the switch inadvertently sliding from a first position to a second position along the length of the track if the switch inadvertently catches on a portion of the case and the case, thus, exerts a resistive force on the switch.

Figure 14:
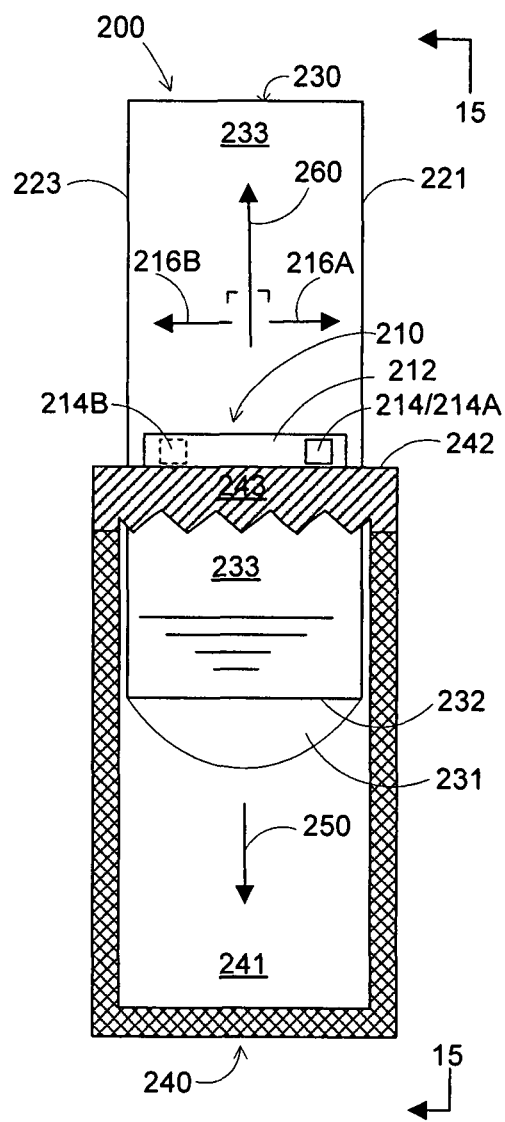
FIG. 14 is a side elevational view of the electronic device of FIGS. 5-13, similar to FIG. 11, in a second stage of insertion into the carrying case of FIGS. 11-13, but with most of a side wall of the carrying case omitted.
Figure 15:
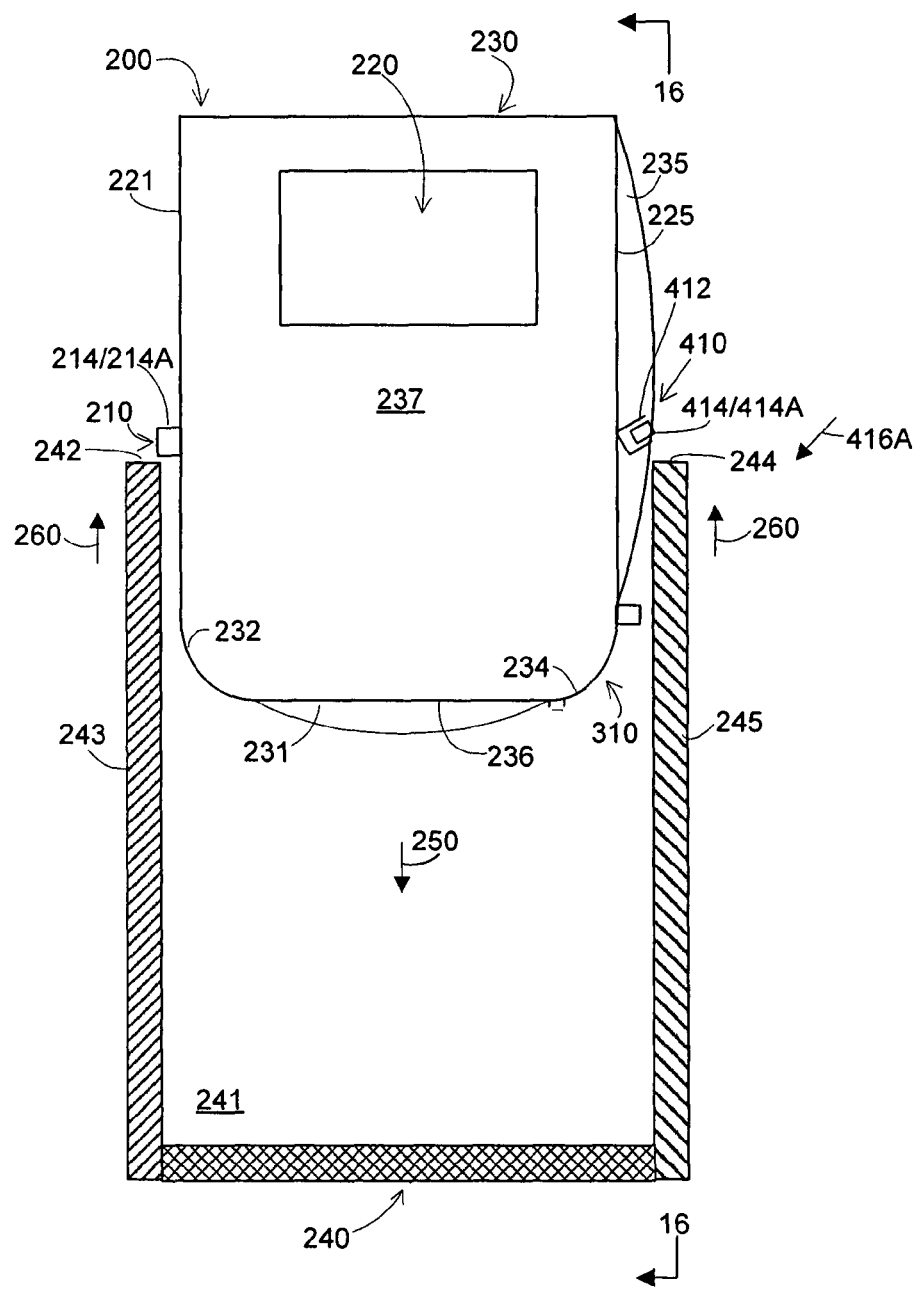
FIG. 15 is a front elevational view of the electronic device of FIGS. 5-14 and the carrying case of FIGS. 11-14, taken from line 15-15 of FIG. 14.

As shown in FIGS. 14 and 15, for example, switch assembly input component 210 can be oriented with respect to the geometry of housing 230 such that, if switch 214 (usually the portion of switch 214 extending from track 212 to a height h above the external portion 207 of housing 230 (see, e.g., FIG. 17)) inadvertently catches on a portion of case 240 (e.g., lip portion 242 at the top of side wall 243 of case 240) as device 200 is inserted further into hollow 241 of case 240 by an insertion force in the direction of arrow 250, whereby wall 243 of case 240 exerts a resistive force on switch 214 in the direction of arrow 260 generally opposite to that of arrow 250, switch 214 may not inadvertently slide along track 212 from a first position (e.g., position 214A) to a second position (e.g., position 214B) due to the resistive force of the case. This can be done by orienting switch assembly input component 210 on the geometry of housing 230 such that the linear directions of movement for switch 214 along track 212 (i.e., the linear directions of arrows 216A and 216B) may not be parallel to and in the same direction as, but rather may be orthogonal (as shown) or at least opposite to, the direction of the anticipated resistive forces exerted by the case on the switch (e.g., the direction of arrow 260). Therefore, the movement for switch 214 along track 212 may also usually be orthogonal to or at least in the same direction as the insertion force (e.g., the direction of arrow 250), as the device is inserted into the case.

For example, as shown in FIGS. 14 and 15, the upward resistive force of case 240 in the direction of arrow 260 can be substantially perpendicular to the direction of linear arrow 216B (i.e., the potential direction in which switch 214 may slide along track 212). Also note, that if switch 214 were in position 214B, the upward resistive force in the direction of arrow 260 would also be substantially perpendicular to the then potential direction 216A in which switch 214 would be able to slide along track 212. This orientation of track 212 with respect to housing 230 and the anticipated resistive forces to be exerted thereupon can prevent the resistive force upon the switch from inadvertently sliding the switch along its track and, thereby, inadvertently changing a function of the device.

Alternatively, or in addition to orienting the linear switch assembly with respect to the housing such that the potential directions of movement for the switch along its track may not be parallel to or in the same direction as the direction of anticipated resistive forces exerted by the case, and in order to prevent or at least mitigate the potential for inadvertent sliding of the switch, the portion of the switch extending from its track above the external portion of the housing can be reduced or removed. For example, in another embodiment of switch assembly input component 210, as shown in FIG. 18, external portions 207' of housing 230 about track 212 can be spaced away from switch 214 at the end (end 213A and/or end 213B) of track 212 by a width w, such that a user may be able to exert a force on the side of switch 214 between external portion 207' of housing 230 and switch 214 to slide switch 214 along track 212 from position 214A to position 214B in the direction of arrow 216B. This can allow the profile of housing 230 of device 200 to be smooth at the area where input component 210 resides, as the switch need not extend above housing 230 (e.g., to a height h, as shown in the embodiment of FIG. 17)).

Moreover, in yet another embodiment of switch assembly input component 210, as shown in FIG. 19, one or more of the two ends (e.g., ends 213A' and 213B') of track 212 can be spaced away from one or more of the functional positions (e.g., positions 214A and 214B) of switch 214 by a distance d, such that a user may be able to exert a force on the side of switch 214 between end 213A' of track 212 (and external portion 207 of housing 230) and switch 214 to slide switch 214 along track 212 from position 214A to position 214B in the direction of arrow 216B, for example. This embodiment can also allow the profile of housing 230 of device 200 to be smooth at the area where input component 210 resides, as the switch need not extend above housing 230 (e.g., to a height h, as shown in the embodiment of FIG. 17). Therefore, the media devices of the present invention can reduce the chances of a switch assembly input component inadvertently changing states. This can be done by orienting the switch assembly with respect to the housing of the device such that the directions of movement for the switch along its track may not be parallel or collinear to the direction of anticipated resistive forces exerted by a carrying case (see, e.g., FIGS. 14 and 15). Moreover, this can also, or alternatively, be done by altering the geometrical relationships between the switch, its track, and the external portions of the housing about the track such that the profile of the device at the area where the input component resides may be smooth (see, e.g., the embodiments of FIGS. 18 and 19).

Switch assembly input component 210 can be any type of switch assembly with a linear or straight track (e.g., track 212) and at least one contact point (e.g., contact point 211A), including, but not limited to, a single pole single throw (SPST) switch, a single pole double throw (SPDT) switch, a single pole center off (SPCO) switch, a double pole single throw (DPST) switch, a double pole double throw (DPDT) switch, a double pole center off (DPCO) switch, a maintained contact switch, a momentary contact switch, a fader or limitless contact switch, or combinations thereof.

As described above, the contour of at least certain portions of housing 230 of electronic device 200 of the present invention can be curved (see, e.g., bottom wall 231, right side wall 235, edge 232, and edge 234). Therefore, according to certain embodiments of the present invention, electronic device 200 can also include at least one user input component that is a curved sliding switch assembly residing at an at least partially curved portion of housing 230. The curved sliding switch assembly can include a linear sliding switch assembly (e.g., a linear sliding switch assembly similar to assembly 210, described above) and a motion adaptor coupled thereto that may translate the rotational motion of a sliding knob along a curved portion of the housing to a linear motion required by the linear sliding switch assembly for changing a functional state of the device.

In certain embodiments of the present invention, and as shown in FIGS. 5-10 and 20-22, for example, input component 310 can be a curved sliding switch assembly that may include a curved track 312 along curved edge 234 of housing 230, within which a sliding knob 314 may slide between a first position (shown as solid-lined position 314A) at a first point along the length of track 312 and at least a second position (shown as broken-lined position 314B) at a second point along the length of track 312. A user of device 200 can slide knob 314 along track 312, either in the curved direction or path of arrow 316B from position 314A to position 314B or in the curved direction or path of arrow 316A from position 314B to position 314A, to change a functional state of device 200 (e.g., whether the device should power up or turn itself off).

Figure 20:
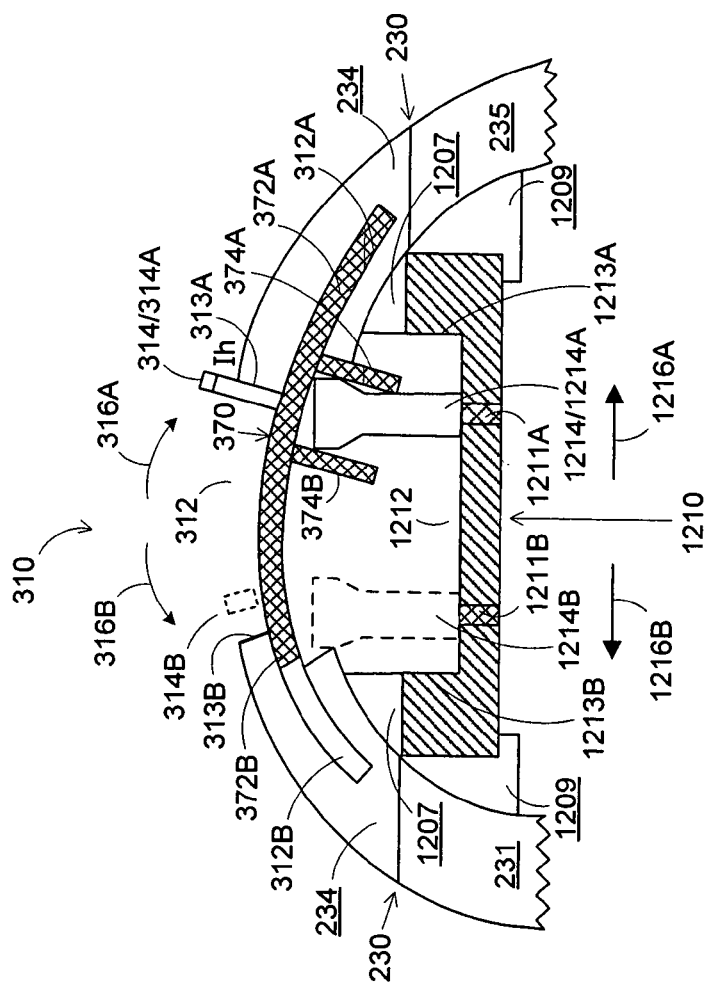
FIG. 20 is a partial horizontal cross-sectional view of the electronic device of FIGS. 5-17, taken from line 20-20 of FIG. 10, in a first stage of actuation in accordance with the principles of the present invention.
Figure 21:
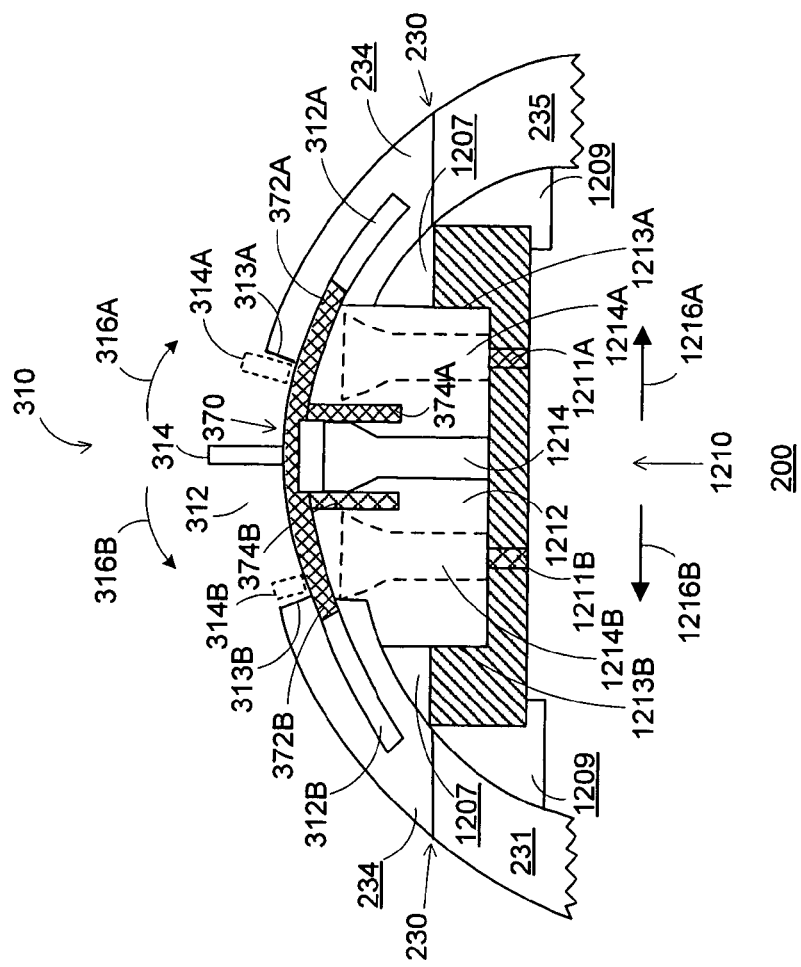
FIG. 21 is a partial horizontal cross-sectional view of the electronic device of FIGS. 5-17 and 20, similar to FIG. 20, but in a second stage of actuation in accordance with the principles of the present invention.
Figure 22:
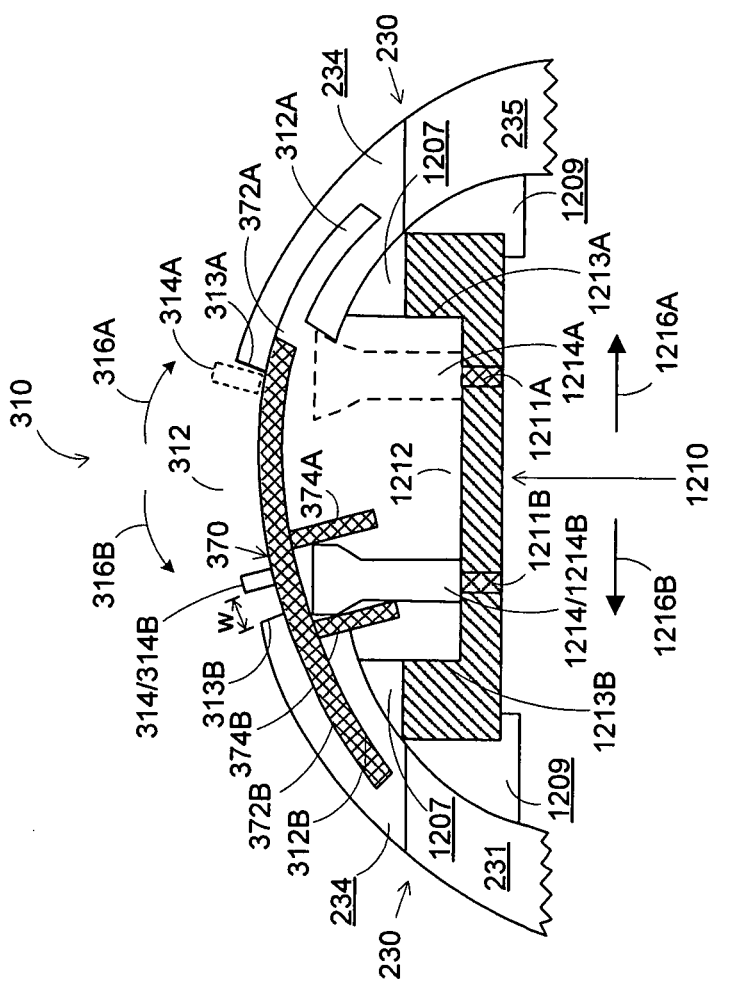
FIG. 22 is a partial horizontal cross-sectional view of the electronic device of FIGS. 5-17, 20, and 21, similar to FIGS. 20 and 21, but in a third stage of actuation according to the principles of the present invention.

As shown in FIGS. 20-22, for example, curved switch assembly input component 310 can also include a linear switch assembly 1210, which may be similar to any of the embodiments described above with respect to switch assembly 210, and a motion adaptor 370 coupled between linear switch assembly 1210 and sliding knob 314 for translating the rotational motion of sliding knob 314 to a linear motion required by linear sliding switch assembly 1210. Linear sliding switch assembly 1210 can be a linear or straight and flat sliding switch assembly that can include a linear track 1212. A linear sliding switch 1214 can slide within track 1212 between a first position (shown as position 1214A in solid-line in FIG. 20 and in broken-line in FIGS. 21 and 22) at a first point along the length of track 1212 and at least a second position (shown as position 1214B in solid-line in FIG. 22 and in broken-line in FIGS. 20 and 21) at a second point along the length of track 1212.

As described above with respect to the various embodiments of sliding switch assembly input component 210, curved sliding switch assembly input component 310 can also include one or more contact points (e.g., contact points 1211A and 1211B) running through linear track 1212 under at least one of the functional positions of linear sliding switch 1214 (e.g., positions 1214A and 1214B). Each of the one or more contact points 1211 of input component 310 can be coupled to a processor (not shown, but described in greater detail hereinbelow) of device 200 within housing 230. When linear sliding switch 1214 is at one of its functional positions along linear track 1212 (e.g., positions 1214A or 1214B), linear sliding switch 1214 can thereby touch a contact point and the function or logic of the processor of device 200 may be changed.

Furthermore, as also described above with respect to the various embodiments of sliding switch assembly input component 210, linear track 1212 of switch assembly input component 310 can be held in place within housing 230 in various ways such that linear sliding switch 1214 may be accessible to adaptor 370 and sliding knob 314, and, thus, a user external to housing 230. For example, as shown in FIGS. 20-22, track 1212 can be held in place about its top and bottom by external bracket portions 1207 and internal bracket portions 1209 of housing 230, respectively.

Motion adaptor 370 can be coupled to sliding knob 314 and sliding switch 1214 of linear sliding switch assembly 1210 in various ways such that, when a user of device 200 slides knob 314 in a rotational motion along a curved portion of housing 230 (e.g., along curved track 312, either in the curved direction of arrow 316B from position 314A to position 314B or in the curved direction of arrow 316A from position 314B to position 314A), adaptor 370 can translate the rotational motion of sliding knob 314 into a linear motion that respectively slides linear sliding switch 1214 along linear track 1212, either in the linear direction of arrow 1216B from position 1214A to position 1214B or in the linear direction of arrow 1216A from position 1214B to position 1214A, for example, to change a functional state of device 200. In certain embodiments of the present invention, motion adaptor 370 can include wings 372A and 372B that may extend in opposite directions and into respective track extensions 312A and 312B formed within housing 230 about curved track 312 (e.g., by curved edge 234 of housing 230, as shown in FIGS. 20-22). Moreover, motion adaptor 370 can include spaced switch grips 374A and 374B that may extend away from sliding knob 314 and about at least a portion of linear sliding switch 1214.

FIGS. 20-22 are cross-sectional views of curved sliding switch assembly input component 310 with sliding knob 314 rotated to three different positions along curved track 312. FIG. 20 (like FIGS. 5-16) shows input component 310 with sliding knob 314 at first position 314A proximal to first end 313A of track 312, and FIG. 22 shows input component 310 with sliding knob 314 at second position 314B proximal to second end 313B of track 312, while FIG. 21 shows input component 310 with sliding knob 314 at an intermediate position between positions 314A and 314B. A user of device 200 can slide knob 314 along track 312, either in the curved direction of arrow 316B from position 314A to position 314B or in the curved direction of arrow 316A from position 314B to position 314A, to change a functional state of device 200 (e.g., whether the device should power up or turn itself off). As shown in FIGS. 20-22, for example, the relationship between the geometry of linear sliding switch 1214 and the geometry of grips 374 thereabout can allow for motion adaptor 370 to maintain contact with at least a portion of sliding switch 1214 and sliding knob 314 at all times as knob 314 slides between positions 314A and 314B along curved track 312, and, thus, as switch 1214 correspondingly slides between positions 1214A and 1214B along linear track 1212.

As shown in FIG. 20, for example, one or more of the functional positions of sliding knob 314 along track 312 can be at the ends of track 312 (e.g., position 314A at end 313A). Therefore, in order for a user to be able to slide the knob along the track, sliding knob 314 can extend away from track 312 above the external portion of housing 230 to a height h (see, e.g., FIG. 20), such that a user (e.g., with its finger) may be able to exert a force on the side of knob 314 above the external portion of housing 230 to slide knob 314 along track 312 from position 314A to position 314B in the direction of arrow 316B, for example. In the embodiment of component 310 shown in FIG. 20, for example, a portion of switch 314 can extend from track 312 to a height h above the external portion of housing 230 that forms the upper part of track extension 312A, thereby causing the profile of housing 230 of device 200 to not be smooth at the area where input component 310 resides.

As described above with respect to prior art media device 100 of FIGS. 1-4, another disadvantage of conventional electronic devices is that the switch of the conventional switch assembly input component tends to inadvertently slide along its track as the device is inserted into a carrying case. Therefore, a switch assembly input component, such as input component 310 of FIG. 20, for example, can be oriented with respect to the geometry of the housing such that the media device may be inserted by a user into a hollow of a carrying case without the sliding knob inadvertently sliding from a first position to a second position along the length of the track if the knob inadvertently catches on a portion of the case and the case, thus, exerts a resistive force on the knob.

Figure 13:
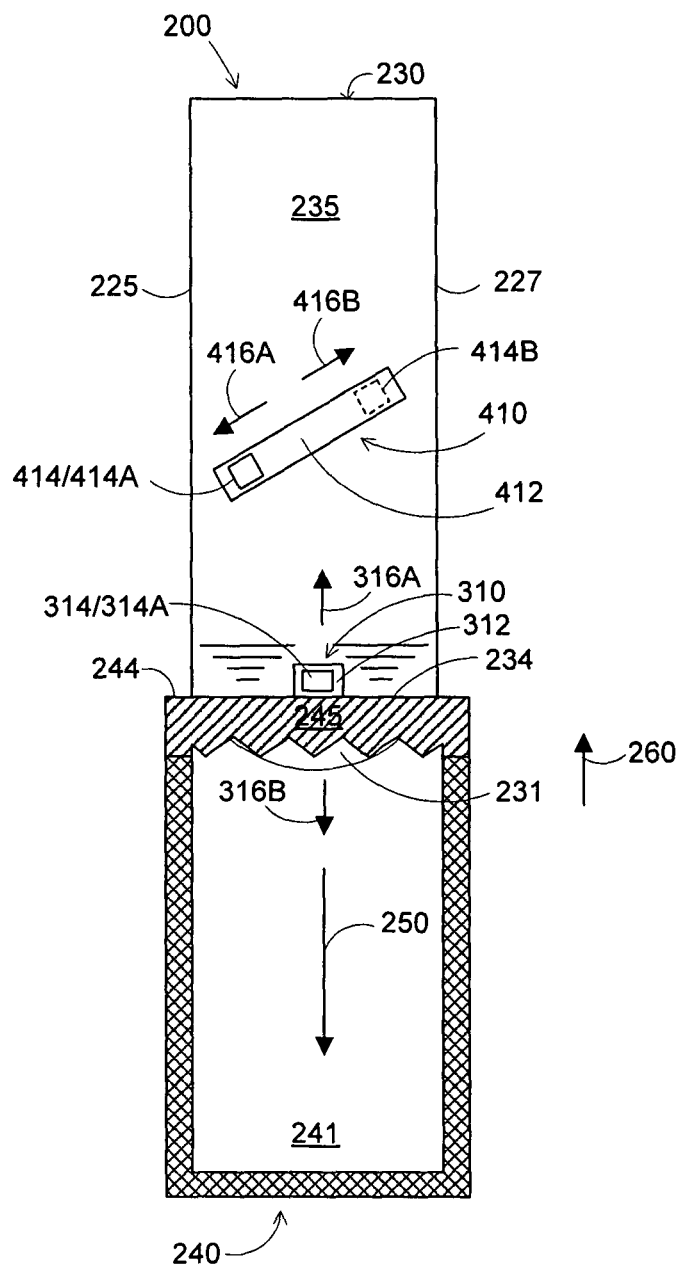
FIG. 13 is a side elevational view of the electronic device of FIGS. 5-12 and the carrying case of FIGS. 11 and 12, taken from line 13-13 of FIG. 12.

As shown in FIGS. 12 and 13, for example, curved sliding switch assembly input component 310 can be oriented with respect to the geometry of housing 230 such that, if knob 314 (usually the portion of switch 314 extending from track 312 to a height h above the external portion of housing 230 (see, e.g., FIG. 20)) inadvertently catches on a portion of case 240 (e.g., lip portion 244 at the top of side wall 245 of case 240) as device 200 is inserted further into hollow 241 of case 240 in the direction of arrow 250, whereby wall 245 of case 240 may exert a resistive force on knob 314 in the direction of arrow 260, generally opposite to that of arrow 250, knob 314 may not inadvertently slide along track 312 from a first position (e.g., position 314A) to a potential second position (e.g., position 314B) due to the resistive force of the case. This can be done by orienting curved sliding switch assembly input component 310 on the geometry of housing 230 such that the potential rotational direction or directions of movement for knob 314 along curved track 312 (i.e., the curved direction of arrow 316B in the stage shown in FIGS. 12 and 13 where knob 314 is already at position 314A) may not even be partially tangential, collinear, or in the same direction as, but rather may be orthogonal or opposite (as shown) to, the direction of the anticipated resistive forces exerted by the case on the knob (e.g., the direction of arrow 260). Therefore, the potential rotational direction or directions of movement for knob 314 along curved track 312 may usually also be in the same direction as the insertion force (i.e., arrow 250), as the device is inserted into the case.

For example, as shown in FIGS. 12 and 13, the upward resistive force of case 240 in the direction of arrow 260 can be substantially opposite to the potential rotational direction of curved arrow 316B at its upper end (i.e., the only direction knob 314 may slide when knob 314 is at position 314A). Also note, that if knob 314 were in position 314B, the upward resistive force in the direction of arrow 260 would be substantially perpendicular to the then potential rotational direction of curved arrow 316A in which knob 314 would be able to slide along track 312. This orientation of track 312 with respect to housing 230 and the expected resistive forces thereupon can prevent the resistive force of the carrying case upon the knob from inadvertently sliding the knob along its curved track and, thereby, inadvertently changing a function of the device.

Alternatively, or in addition to orienting the curved switch assembly with respect to the housing such that the directions of movement for the sliding knob along its track are not parallel or collinear to the direction of anticipated resistive forces exerted by the case, in order to prevent or at least mitigate the potential for inadvertent sliding of the knob, the portion of the knob extending from its track above the external portion of the housing can be reduced or removed. For example, in another embodiment of a portion of switch assembly input component 310, as shown in FIG. 22, for example, one or more of the functional positions of sliding knob 314 along track 312 can be spaced from a respective end of track 312 (e.g., position 314B at end 313B) by a width w, such that a user may be able to exert a force on the side of knob 314 between housing 230 at end 313B of track 312 and knob 314 to slide knob 314 along track 312 from position 314B to position 314A in the direction of arrow 316A. This can allow the profile of housing 230 of device 200 to be smooth at the area where input component 310 resides, as the knob need not extend above housing 230 (e.g., to a height h (as shown in the embodiment of FIG. 20 at position 314A)). Therefore, the electronic devices of the present invention can reduce the chances of a curved switch assembly input component inadvertently changing states. This can be done by orienting the switch assembly with respect to the housing of the device such that the directions of movement for the knob along its curved track may not even be partially parallel or collinear to the direction of anticipated resistive forces exerted by a carrying case (see, e.g., FIGS. 12 and 13). Moreover, this can also, or alternatively, be done by altering the geometrical relationships between the knob, its curved track, and the external portions of the housing about the track such that the profile of the device may be smooth at the area where the curved switch assembly input component resides (see, e.g., FIG. 22 at position 314B).

As mentioned above with respect to input component 210, linear switch assembly 1210 of curved switch assembly input component 310 can be any type of switch assembly with a linear or straight track (e.g., track 1212) and at least one contact point (e.g., contact point 1211A), including, but not limited to, a single pole single throw (SPST) switch, a single pole double throw (SPDT) switch, a single pole center off (SPCO) switch, a double pole single throw (DPST) switch, a double pole double throw (DPDT) switch, a double pole center off (DPCO) switch, a maintained contact switch, a momentary contact switch, a fader or limitless contact switch, or combinations thereof.

Moreover, it is to be understood that motion adaptor 370 of curved switch assembly input component 310 can be any type of motion adaptor that may be able to translate the rotational motion of sliding knob 314 into the required linear motion of sliding switch 1214 for changing a function of device 200, including, for example, a ball and socket joint.

In certain embodiments of the present invention, a media device, such as device 200, can be provided with a switch assembly input component that may be similar to linear switch assembly input component 210 or curved switch assembly input component 310, but that may be oriented such that the directions or paths of movement for the sliding knob or switch of the assembly along its track are not necessarily orthogonal or opposite to the direction of anticipated resistive forces exerted on the knob. For example, according to certain embodiments of the present invention and as shown in FIGS. 5-10, for example, device 200 can be provided with a curved switch assembly input component 410 that may be a curved input component similar to curved input component 310. Curved input component 410 can include an at least partially curved track 412 along the at least partially curved surface of right side wall 235 of housing 230. A sliding knob 414 can slide within track 412 between a first position (shown as solid-lined position 414A) at a first point along the length of track 412 and at least a second position (shown as broken-lined position 414B) at a second point along the length of track 412. A user of device 200 can slide knob 414 along track 412, either in the at least partially curved direction or path of arrow 416B from position 414A to position 414B or in the at least partially curved direction or path of arrow 416A from position 414B to position 414A, to change a functional state of device 200 (e.g., whether the device should power up or turn itself off).

Figure 16:
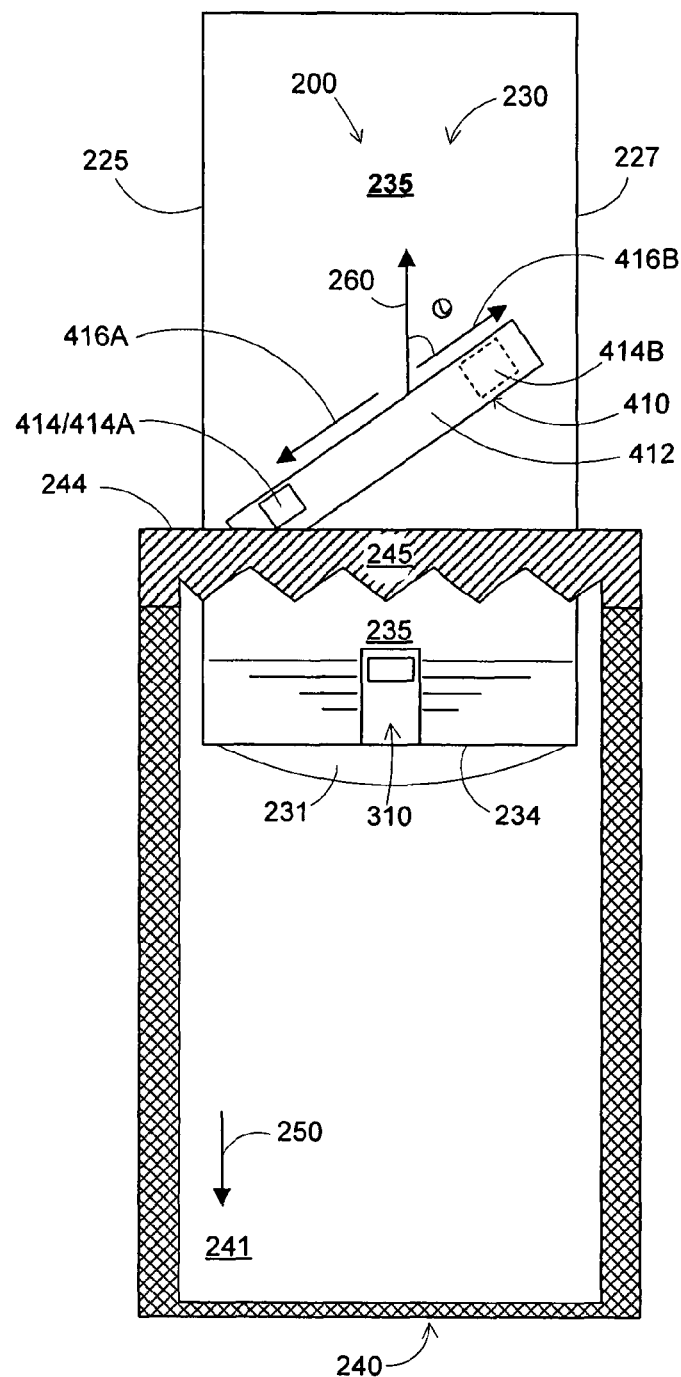
FIG. 16 is a side elevational view of the electronic device of FIGS. 5-15 and the carrying case of FIGS. 11-15, taken from line 16-16 of FIG. 15.

As shown in FIGS. 15 and 16, for example, curved sliding switch assembly input component 410 can be oriented with respect to the geometry of housing 230 such that, if knob 414 inadvertently catches on a portion of case 240 (e.g., lip portion 244 at the top of side wall 245 of case 240) as device 200 is inserted further into hollow 241 of case 240 with an insertion force in the direction of arrow 250, whereby wall 245 of case 240 exerts a resistive force on knob 414 in the direction of arrow 260, generally opposite to that of the insertion force, knob 414 may not inadvertently slide along track 412 from a first position (e.g., position 414A) to a second position (e.g., position 414B) due to the resistive force of the case. This can be done, not by orienting the track of the input component orthogonal or opposite to the direction of the anticipated resistive forces (as with input components 210 and 310, respectively), but rather by orienting switch assembly input component 410 on the geometry of housing 230 such that the potential directions of movement for knob 414 along track 412 (i.e., the directions of arrows 416A and 416B) may be offset from the direction of anticipated resistive force of the case (e.g., the direction of arrow 260) only by a sufficient angle θ.

For example, as shown in FIGS. 15 and 16, the upward resistive force of case 240 in the direction of arrow 260 can be offset from the potential direction of movement for knob 414 along track 412 (i.e., the direction of arrow 416B) by an angle θ that need not be a right angle or a straight angle, but that rather may be any angle in the range of between 1° and 179°, or in the range of between 30° and 150°. This can prevent the resistive force of the carrying case upon the knob from inadvertently sliding the knob along its track and, thereby, inadvertently changing a function of the device.

While the embodiments of carrying case 240 have been described above as including a hollow 241 for accepting a device 200 when it is inserted in the direction of an arrow 250 that is shown to be substantially parallel to the intersects of walls defining height H of the device (see, e.g., FIG. 11 and edges 221 and 223), it is to be understood that the direction of the insertion of a device of the present invention into a carrying case may have any orientation with respect to the geometry of the device. For example, the device can be inserted into a carrying case in a direction substantially perpendicular to the intersects of the walls defining height H of the device. Alternatively, the direction of insertion of the device into a carrying case can be curved, but that will not alter its fundamental nature as within the spirit and scope of the present invention.

Furthermore, while the embodiments of an insertion direction 250 and a corresponding resistiveness direction 260 for and against device 200, respectively, have been described above in the context of insertion into and a resistive force exerted by a carrying case 240, it is to be understood that the resistive force against a device of the present invention can be exerted due to various other phenomena besides insertion of the device into a carrying case, including, but not limited to, resistive forces exerted by the wind or clothing of a user when he or she is exercising with the device, resistive forces exerted by the hands of a user when he or she picks up the device, or any other situation wherein the orientation of a sliding track of a switch assembly according to the principles of the present invention may mitigate the occurrence of inadvertent sliding of a switch. These various phenomena may not alter the fundamental nature of the directions of insertion and resistive force as within the spirit and scope of the present invention.

Figure 7:
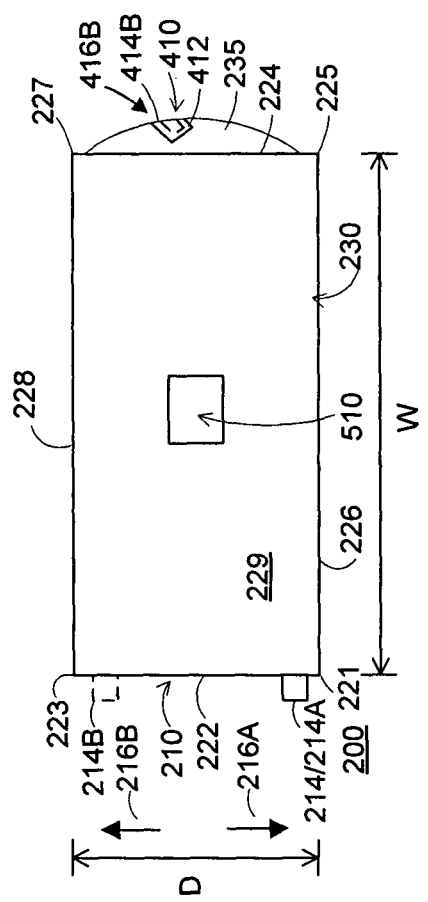
FIG. 7 is a top elevational view of the electronic device of FIGS. 5 and 6, taken from line 7-7 of FIG. 5.
Figure 8:
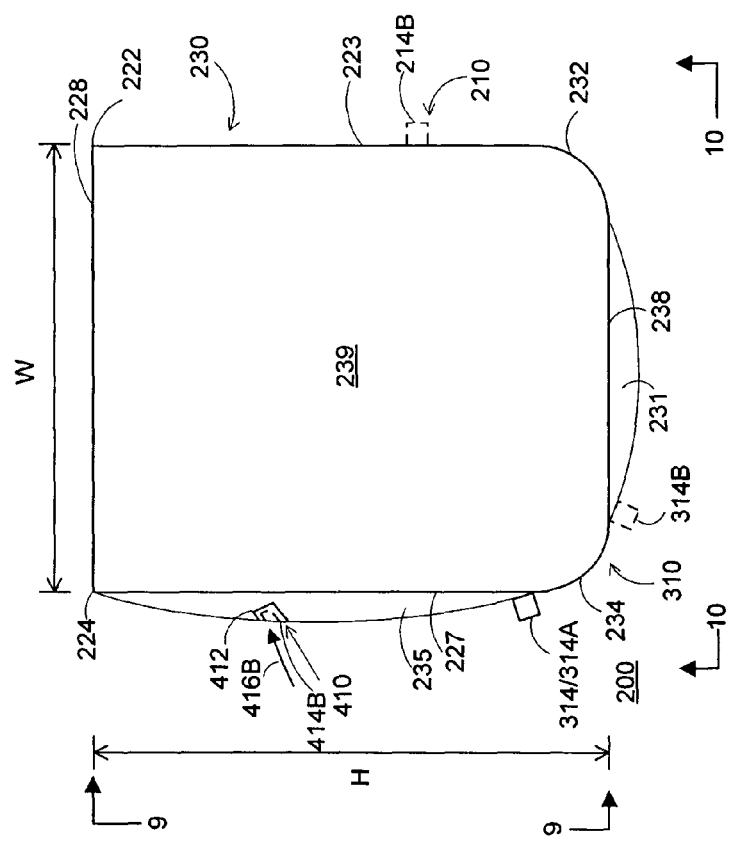
FIG. 8 is a rear elevational view of the electronic device of FIGS. 5-7, taken from line 8-8 of FIG. 6.
Figure 9:
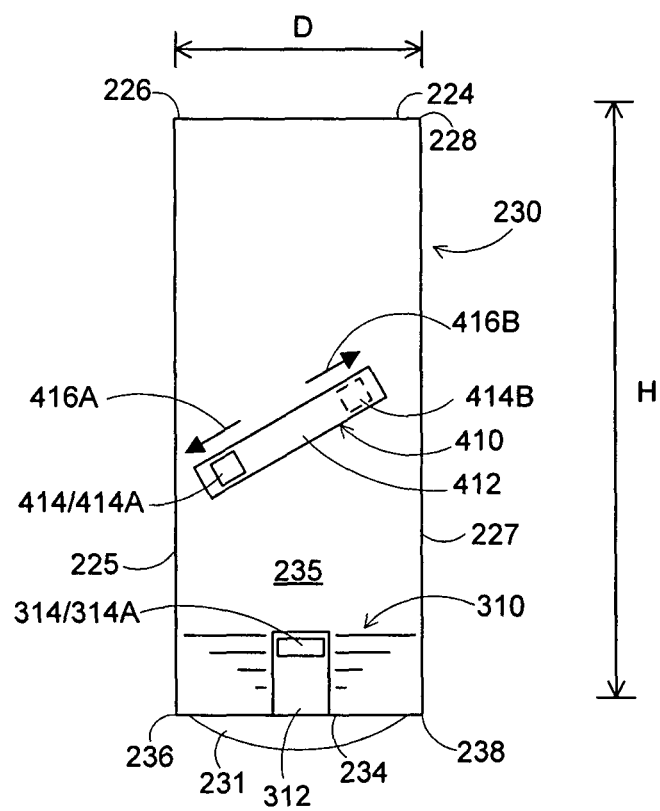
FIG. 9 is a side elevational view of the electronic device of FIGS. 5-8, taken from line 9-9 of FIG. 8.
Figure 10:
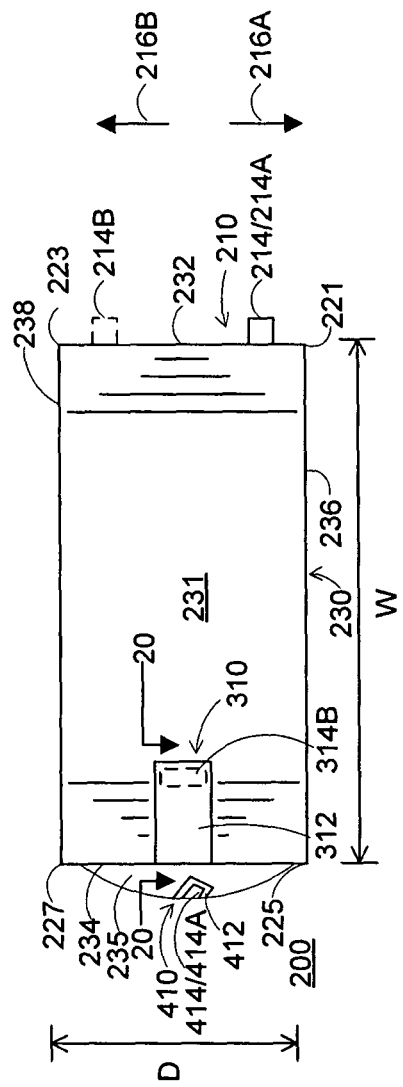
FIG. 10 is a bottom elevational view of the electronic device of FIGS. 5-9, taken from line 10-10 of FIG. 8.

In certain embodiments, electronic device 200 can also include at least one user input component that may be of a variety of forms other than that of a sliding switch assembly (see, e.g., input components 210, 310, and 410). For example, as shown in FIG. 7, device 200 can also include one or more input components 510 that may take other various forms, including, but not limited to buttons, keypads, dials, scroll wheels, touch screen displays, electronics for accepting audio and/or visual information, antennas, infrared ports, or combinations thereof.

According to certain embodiments of the present invention, the position of one or more of input components 210, 310, 410, and/or 510 can be widely varied relative to the position of another one or more of input components 210, 310, 410, and/or 510. For example, they can be adjacent one another or spaced apart. Additionally, each one of the one or more input components 210, 310, 410, and/or 510 can be placed at any external surface (e.g., top, side, front, or back) of housing 230 that may be accessible to a user during manipulation of the electronic device.

Furthermore, in certain embodiments of the present invention, each one of the one or more input components 210, 310, 410, and/or 510 of device 200 can be configured to provide one or more dedicated control functions for making selections or issuing commands associated with operating the device. By way of example, in the case of a music file player, the switch assembly functions of each one of components 210, 310, and/or 410 can be associated with powering up or down the device, opening or closing a menu, playing or stopping a song, changing a mode, and the like.

As mentioned above, certain embodiments of electronic device 200 can also include at least one device output component that provides the user with valuable device generated information. For example, as shown in FIGS. 5-10, device 200 can also include one or more output components 220 that may take various forms, including, but not limited to audio speakers, headphones, audio line-outs, visual displays, antennas, infrared ports, or combinations thereof.

Furthermore, in certain embodiments of the present invention, each one of the one or more switch assembly input components 210, 310, and/or 410 can be integrated with some other input component 510 and/or output component 220 on the electronic device, such as switches, push-buttons, keys, dials, trackballs, joysticks, touch pads, touch screens, scroll wheels, displays, microphones, speakers, cameras and the like. Each of these individual interfaces may include switch assemblies either incorporated therein, such as a switch assembly on a joystick, or forming an integral part thereof, such as a switch assembly with a push-button thereon.

Housing 230 of electronic device 200 can also include a processor (not shown), a storage device (not shown), communications circuitry (not shown), a bus (not shown), and a power supply (not shown) for powering the device. The bus of device 200 can provide a data transfer path for transferring data, to, from, or between at least the processor, the storage device, and the communications circuitry. The processor (not shown) of device 200 can control the operation of many functions and other circuitry included in the media device 200. For example, the processor can receive user inputs from input component 210 and drive output component 220.

The storage device (not shown) of device 200 can include one or more storage mediums, including, for example, a hard-drive, a permanent memory such as ROM, a semi-permanent memory such as RAM, or cache, that may store media (e.g., music and video files), software (e.g., for implementing functions on device 200), wireless connection information (e.g., information that may enable device 200 to establish wireless communication with another device or server), subscription information (e.g., information that keeps track of podcasts, television shows, or other media that the user subscribes to), and any other suitable data.

The communications circuitry (not shown) of device 200 can include circuitry for wireless communication (e.g., short-range and/or long-range communication). For example, the wireless communication circuitry of device 200 can be wi-fi enabling circuitry that permits wireless communication according to one of the 802.11 standards. Other wireless protocol standards could also be used, either in alternative or in addition to the identified protocol. Another network standard may be Bluetooth®. The communications circuitry can also include circuitry that enables device 200 to be electrically coupled to another device (e.g., a computer or an accessory device) and communicate with that other device. Furthermore, additional electrical components (not shown) can be provided by device 200 for sending and receiving media, including, but not limited to, microphones, amplifiers, digital signal processors (DSPs), image sensors (e.g., charge coupled devices (CCDs)) or optics (e.g., lenses, splitters, filters, etc.), antennas, receivers, transmitters, transceivers, and the like.

While there have been described electronic devices with housings having smoother profiles and with switch assembly input components having switches that move along tracks in directions at least partially offset from the directions of anticipated resistive forces, it is to be understood that many changes may be made therein without departing from the spirit and scope of the present invention. It will also be understood that various directional and orientational terms such as "vertical" and "horizontal," "front" and "back," "left" and "right," "top" and "bottom," "side" and "edge" and "corner," "height" and "width" and "depth," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention. Moreover, an electronic device constructed in accordance with the principles of the present invention can be of any suitable three-dimensional shape, including, but not limited to, a sphere, cone, octahedron, or combination thereof, rather than a hexahedron, as illustrated by device 200 of FIGS. 5-16, for example. Those skilled in the art will appreciate that the invention can be practiced by other than the described embodiments, which are presented for purposes of illustration rather than of limitation, and the invention is limited only by the claims which follow.

What is claimed is:

1. An electronic device, comprising:
 a processor;
 a housing; and
 a switch assembly coupled to the processor and comprising:
  a curved track associated with the housing and comprising:
   a first curved extension; and
   a second curved extension;
  a knob configured to slide along the curved track;
  a linear track;
  a linear switch configured to slide within the linear track; and
  a motion adaptor of unitary structure contacting the knob and the linear switch and comprising:
   a first end configured to slide within the first curved extension when the linear switch takes a first position; and
   a second end configured to slide within the second curved extension when the linear switch takes a second position;
 wherein:
  the motion adaptor is configured to slide the linear switch along the linear track in a linear direction when the knob slides along the curved track in a curved direction.

2. The electronic device of claim 1, wherein the knob is configured to slide in a curved direction offset from a direction of a resistive force applied to the knob such that the curved direction is offset from the direction of the resistive force by an angle of between 30° and 150°.

3. The electronic device of claim 2, wherein a portion of the curved direction is capable of sliding the knob along a curved portion of the housing.

4. The electronic device of claim 2, wherein a curved portion of the curved track is formed in a curved portion of the housing.

5. The electronic device of claim 1, wherein the motion adaptor comprises spaced switch grips that extend away from the knob and that extend about at least a portion of the linear switch, and wherein each of the spaced switch grips maintains contact with the linear switch when the linear switch slides along the linear track.

6. The electronic device of claim 1, wherein:
 the linear track comprises a first linear track end and a second linear track end;

the curved track comprises a first track end and a second track end;
the first linear track end is adjacent the first user track end; and
the second linear track end is adjacent the second user track end.

7. A user input component for an electronic device, the input component comprising:
a curved user track associated with a housing of the electronic device and comprising:
a first curved extension; and
a second extension;
a knob configured for rotational movement along the curved user track;
a switch assembly configured for linear movement for changing an operational state of the electronic device and comprising:
an adaptor contacting the knob and the switch assembly, wherein the adaptor is of unitary structure and is configured for translating the knob movement along the curved user track to the switch assembly movement in a linear direction from a first functional position coupled to a processor to a second functional position coupled to the processor, wherein the adaptor comprises spaced switch grips that extend away from the knob and that at least partially sandwich a portion of the switch assembly therebetween, the spaced switch grips maintaining contact with the portion of the switch assembly during the linear movement of the switch assembly; and
wherein the adaptor of unitary structure comprising:
a first end configured to slide within the first curved extension when the switch assembly takes the first function position; and
a second end configured to slide within the second curved extension when the switch assembly takes the second function position.

8. The user input component of claim 7, wherein the curved user track is along a surface of a housing of the electronic device.

9. The user input component of claim 8, wherein the surface is an at least partially curved edge of the housing.

10. The user input component of claim 8, wherein the rotational movement is along the curved user track in at least a first user direction, and wherein the curved user track is oriented along the surface to offset the first user direction from a direction of a resistive force applied to the knob.

11. The user input component of claim 10, wherein the resistive force is exerted by a case for the electronic device.

12. The user input component of claim 8, wherein a curved portion of the curved user track is along a curved portion of the housing of the electronic device.

13. The user input component of claim 7, wherein the adaptor comprises a unitary structure that is capable of maintaining contact with at least a portion of the knob and with at least a portion of the switch at all times as the adaptor translates the knob movement to the switch movement.

14. The user input component of claim 7, wherein:
the switch track comprises a first switch track end and a second switch track end;
the curved user track comprises a first user track end and a second user track end;
the first switch track end is adjacent the first user track end; and
the second switch track end is adjacent the second user track end.

15. A method for changing an operational state of an electronic device, the method comprising:
sliding a knob of unitary construction in a rotational motion along a curved track in a surface of the electronic device; and
associating the curved track having a first curved extension and a second extension with a housing of the electronic device;
translating the rotational motion of the knob to a linear motion with a unitary structure motion adapter contacting the knob; and
sliding a switch assembly in contact with the unitary structure motion adaptor with the linear motion along a switch track from a first functional position along the switch track where the switch assembly touches a first contact point coupled to a processor of the electronic device to a second functional position along the switch track where the switch assembly touches a second contact point coupled to the processor, wherein the first and second contact points are disposed through respective portions of the switch track; and
sliding a first end of the unitary structure motion adaptor within the first curved extension when the switch assembly takes the first functional position; and
sliding a second end of the unitary structure motion adaptor within the second curved extension when the switch assembly takes the second functional position.

16. The method of claim 15, wherein the surface is at least partially curved.

17. The method of claim 15, wherein the surface is a side wall of a housing of the electronic device.

18. The method of claim 15, wherein the surface is an edge at an intersect of at least two walls of a housing of the electronic device.

19. The method of claim 15, wherein a curved portion of the curved user track is in a curved portion of the surface of the electronic device.

20. The method of claim 15, wherein the translating comprises maintaining a first contact between a unitary adaptor structure and at least a portion of the knob and maintaining a second contact between the unitary adaptor structure and at least a portion of the switch.

* * * * *